United States Patent [19] [11] 4,212,047
Napiorkowski [45] Jul. 8, 1980

[54] FAIL-SAFE/SURGE ARRESTER SYSTEMS

[75] Inventor: John Napiorkowski, Hempstead, N.Y.

[73] Assignee: TII Corporation, Lindenhurst, N.Y.

[21] Appl. No.: 719,077

[22] Filed: Aug. 31, 1976

[51] Int. Cl.[2] .......... H02H 3/22
[52] U.S. Cl. .......... 361/124; 361/119; 337/32; 337/33
[58] Field of Search .......... 361/124, 119, 120, 118, 361/117, 125, 129, 56; 337/15, 28, 32, 33, 34; 313/244, 246, 247

[56] References Cited

U.S. PATENT DOCUMENTS

| | | | |
|---|---|---|---|
| 1,350,329 | 8/1920 | Parker | 337/32 |
| 1,457,249 | 5/1923 | Janson et al. | 361/124 |
| 1,580,516 | 4/1926 | Marbury | 361/126 |
| 1,901,893 | 3/1933 | Brodie | 313/268 |
| 3,254,179 | 5/1966 | Howard | 337/18 |
| 3,254,181 | 5/1966 | Lemieux | 337/18 |
| 3,281,625 | 10/1966 | Wanaselja | 361/120 |
| 3,340,431 | 9/1967 | Wanaselja | 361/120 |
| 3,522,570 | 8/1970 | Wanaselja | 337/28 |
| 3,569,786 | 3/1971 | Kanagi | 361/131 |
| 3,813,577 | 5/1974 | Kawiecke | 361/91 |
| 3,896,343 | 7/1975 | Baker et al. | 361/120 |
| 4,034,326 | 7/1977 | Hill et al. | 361/124 X |
| 4,056,840 | 11/1977 | Lundsgaard et al. | 361/124 |

FOREIGN PATENT DOCUMENTS 1409807 7/1965 France .

*Primary Examiner*—Patrick R. Salce
*Attorney, Agent, or Firm*—Morgan, Finnegan, Pine, Foley & Lee

[57] ABSTRACT

Disclosed herein are surge arrester configurations employing non-metallic and preferably plastic fusible elements which normally insulate biased short circuiting members from shorting the surge arrester but which, in the event of certain forms of excessive overloads, fuse to thereby permit the shorting elements to short circuit the arrester gap. In addition, the embodiments include integral backup air gaps to provide additional backup protection covering certain gas tube failure modes. In the illustrated embodiments, the shorting elements each take the form of a conductive clip with one set of spring fingers in electrical contact with the line (end) electrode and another set urged in the direction of the ground electrode but separated therefrom by an annular plastic fusible sleeve coaxially coupled to the center body housing. Fusion of the sleeve in the presence of a sustained overload causes it to yield, thereby permitting the respective spring fingers to move into contact with the ground electrode, causing a short circuit.

22 Claims, 7 Drawing Figures

FAIL-SAFE/SURGE ARRESTER SYSTEMS

BACKGROUND

Gas tube overvoltage protectors are widely used for the protection of equipment from overvoltage conditions which may be caused by lighting, high voltage line contact, and the like.

It is also a widely practiced technique to associate various fail-safe arrangements with such tubes and with other types of protectors, e.g., air gap arresters, to meet various contigencies. For example, the presence of a sustained overload, as where a power line has come in continued contact with a protected telephone line, produces a concomitant sustained ionization of the gas tube and the resultant passage of heavy currents through the tube. Such currents will in many cases destroy the overvoltage protector and may also constitute a fire hazard.

One common approach to this problem is to employ fusible elements which fuse in the presence of such overloads and provide either a permanent short circuiting of the arrester directly, or function to release another mechanism, e.g., a spring loaded shorting bar, which provides the short circuit connection (commonly, the arrester electrodes are both shorted and grounded). The presence of the permanent short and ground condition serves to flag attention to that condition thus signalling the need for its inspection or replacement. Examples of this type of fail-safe protection are found in U.S. Pat. Nos. 3,254,179, 3,281,625, 3,340,431, 3,396,343 and 3,522,570. Several of these patents also incorporate with the fail-safe feature, a backup air gap arrangement so that there is both fail-safe fusible (short) type protection as well as backup air gap protection. Copending application Ser. No. 719,076, filed Aug. 31, 1976, entitled "Multi-Function Fail-Safe Arrangements For Overvoltage Gas Tubes," now U.S. Pat. No. 4,062,054, and owned by the assignee of the instant invention, also discloses several related arrangements and is incorporated herein by reference.

A characteristic common in the foregoing arrangements is the employment of metallic materials for the fusible elements. This is an established practice in the art directed by the object of forming from the fused material an electrically conductive shorting path to thereby short circuit the arrester electrodes. The selection is also ordinarily dictated by the well known, widely exploited fusion properties of metals, and by thermal conductivity and related factors involved in fail-safe arrester designs.

The present invention is based on the discoveries that an effective fail-safe function can be achieved by employing a non-metallic fusible material and that important advantages are consequently realized. The fusible material is an electrical insulator which in the exemplary embodiments is interposed between one or more of the electrodes and the shorting mechanism. Surprisingly, the response of the non-metallic material to thermal conditions is precise and, moreover, does not leave an insulative film in the course of fusing which might otherwise interfere with the short circuit contact.

While the patent literature discloses the use of non-metallic fusible materials in certain fail-safe applications (see U.S. Pat. Nos. 1,580,516 and 1,457,249) the arrangements suggested therein involve movement of the arrester electrodes and/or direct arc involvement, as well as other materials, techniques and environmental factors which compromise many of the advantages that applicant has found can be realized from the non-metallic fusion materials disclosed herein.

OBJECTS

Among the results achieved in the practice of the invention are:

(1) a marked improvement in the precision with which the fail-safe action occurs; in embodiments of the invention conditions which trigger the fail-safe action are more precisely predetermined and more predictable;

(2) the fire hazard associated with conventional units because of the presence of molten metal, metal explosion and the like, during the fusion action is virtually eliminated;

(3) metal oxidation problems and metal splatter problems are avoided;

(4) packaging and encapsulation are greatly simplified;

(5) the foregoing improvements and new results are achieved with a structure which is more simple, compact and lighter than its predecessors and thus less costly, of greater durability and reliability, and of greater flexibility for adaption to many protector environments including retrofits, OEM, applique, and station applications in the communication, power, data processing, traffic control, alarm and other fields where surge protection is desirable.

Other objects and advantages of the invention will be apparent from the following description and in the practice of the invention which may be summarized as comprising a surge arrester having two or more electrodes defining an ionizable (air or gas) gap; short circuiting means biased toward a short-circuit connection with said electrodes; non-metallic fusible means in thermal contact with said gap and interposed between at least one of said electrodes and said short circuiting means to prevent said short circuit connection except in the presence of overload causing said fusible means to fuse and yield to permit the establishment of said short circuit connection.

DRAWINGS

Illustrating exemplary embodiments of the invention are the drawings of which:

DETAILED DESCRIPTION OF THE INVENTION

In the embodiment illustrated in FIGS. 1-4 a gas tube 10 is provided, the tube including a center body 10A and electrode end caps 10B each separated from the center body 10A by a respective insulated sleeve section 10C.

The arrester 10, which is of known construction and may comprise for example TII Model 31, has its end electrodes (not shown) extending inwardly from the end caps 10B toward the center of the tube interior to define a gap between the electrodes. Spacing and dimensions are such that each electrode also forms a gap with the center body conductive casing section 10A.

The tube is filled with a gas and the electrode end caps 10B are each provided as by welding with a lead 11B and terminal 12B, e.g., a spade lug, for connection to the circuit to be protected. Center body 10A is likewise provided with a lead 11A welded thereto and the associated connection 12A for connection to ground.

In the presence of overvoltage conditions the gas in tube 10 ionizes thereby creating in known manner, conductive shunting paths between each line of the protected circuit and ground (via the respective terminal lead 11B and ground lead 11A).

Coaxially fitted on center body 10A are a pair of annular members or sleeves 12 of fusible material, each located to one side of the center section of the center body where lead 11A makes its connection.

Sleeves 12 are of non-metallic, electrically insulative composition. Suitable materials will have melt temperatures in the range corresponding to thermal conditions at arrester thermal overload and will have suitable dielectric strength, dielectric constant, dissipation factor and volume and surface resistivity to provide the requisite insulative function. The preferred material should also be free of embrittlement due to heat aging, be nonflammable under the overload conditions, have good mechanical properties and be inert to corrosives and weather.

Exemplary of such a class of materials are certain of the fluoroplastics, such a fluorinated ethylene propylene polymer (FEP), the polymer perfluoroalkoxy (PFA), the modified copolymer of ethylene and tetrafluoroethylene (ETFE) (marketed under the duPont company trademark Tefzel), and poly (ethylene-chlorotrifluoro-ethylene) (E-CTFE copolymer) marketed under the Allied Chemical Corporation mark Halfar. (The fluoroplastic polytetrafluoroethylene (TFE), on the other hand, does not have suitable melt properties for the illustrated application.) In the example of FIGS. 1–4, sleeves 12 are formed of 0.38LG FEP tubing, AWG 2.

Figure 4:
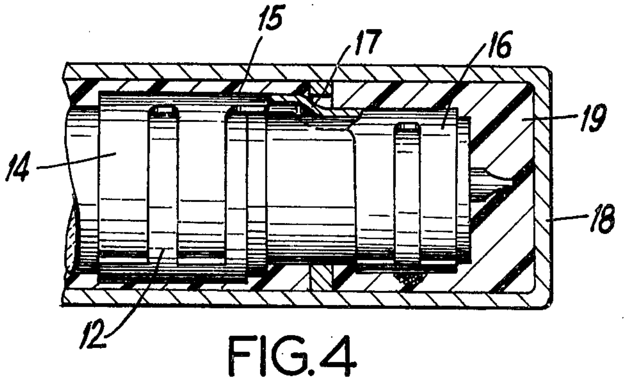
FIG. 4 is a cross-sectional view taken along lines 4—4 of FIG. 1.

As illustrated in the Figures, each sleeve 12 is resiliently engaged by pairs of fingers 14 of a short circuiting clip 15, an elevational view of which is shown in FIG. 4. Each clip 15, which is illustratively of grain oriented tin plated carbon steel, heat treated for stress relief from hydrogen embrittlement after plating, includes another set of spring fingers 16 which engage and electrically contact the respective end cap 10B, the spring fingers 14 and 16 being integrally connected by the bridge section 17 of each clip. As seen in greater detail in FIG. 2, the fingers 14 of the short-circuit clips are spaced from contact with center body 10A by reason of the respective fusible sleeve 12. Specifically, each of the fingers 14 includes a contact portion 14A which is urged in the direction of contact with grounded center body 10A and which consequently presses resiliently on the sleeve section 12 interposed therebetween.

During normal operation of the arrester 10, transient surges produce ionization in the normal manner to protect the subject equipment. If, however, a sustained surge condition occurs as where a line is permanently contacted by a higher voltage line, the resultant ionization currents flowing through the arrester produce excessive heat; the sleeves 12, placed in the arrester region to respond to this heating, thereby fuse. As this occurs, spring fingers 14, and in particular the contact sections 14A thereof, move into contact with center body 10A as the fusible sleeve material beneath those contacts yields and flows. When electrical contact is made a short circuit is established between the respective end cap and the center body thus providing a fail-safe (short) action.

Non-metallic materials other than the foregoing may be used as the fusible members provided they have appropriate electrical insulation properties and undergo a predictable change of mechanical properties under the specified overload condition to permit the short circuiting action to occur.

Figure 1:
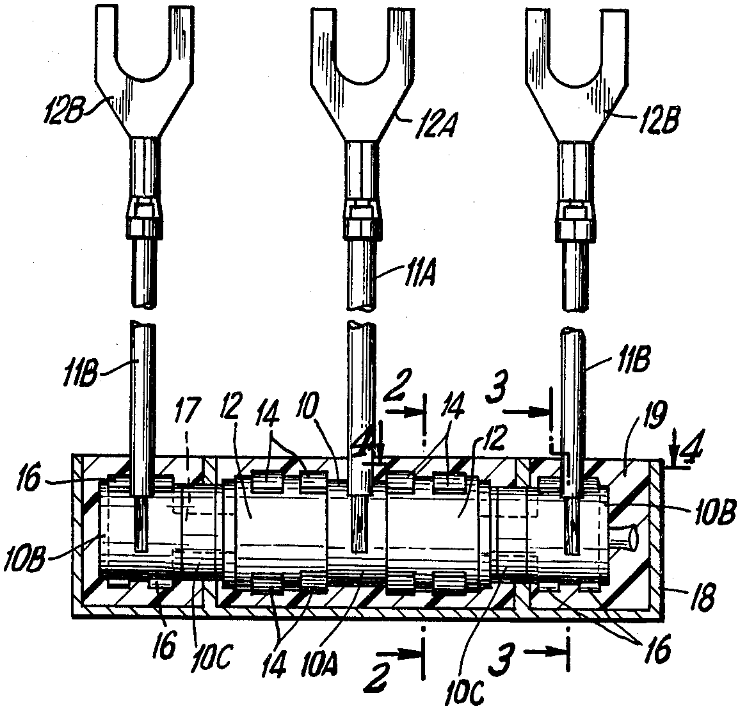
FIG. 1 is an elevational view, partly in section and partly schematic, of a first embodiment.
Figure 2:
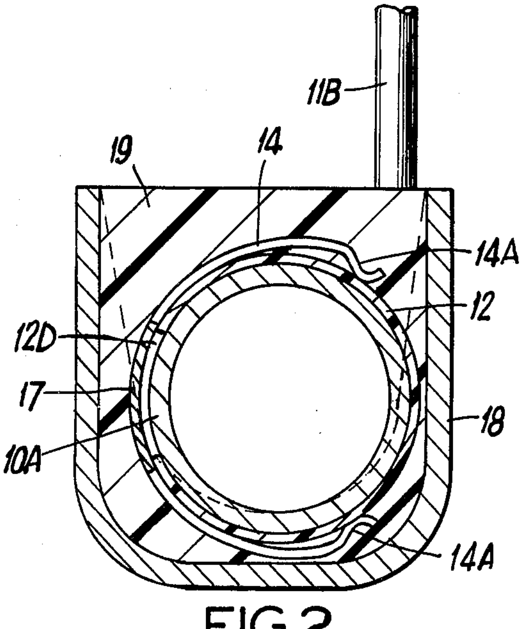
FIG. 2 is a cross-sectional view taken along the lines 2—2 of FIG. 1.
Figure 3:
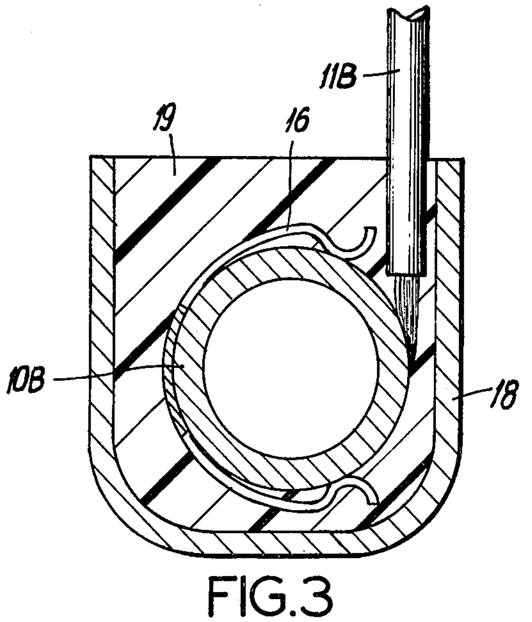
FIG. 3 is a cross-sectional view taken along the lines 3—3 of FIG. 1.

In addition to facilitating the foregoing fail-safe features, the sleeves 12 may include a cutout portion as at 12D in FIG. 2 to thus define an air gap between center body 10 and the respective clip 15 which is in electrical contact with one of the end electrodes.

With this additional provision a failure of the gas tube in the open mode, as for example by reason of a gas leak, does not result in a loss of protection; the air gap provides backup protection prior to arrester replacement.

To facilitate use in a wide variety of applications, the arrester assembly of FIGS. 1–4 is potted in a modular shell 18, the potting material 19 therein being an epoxy compound. Prior to the potting the arrester assembly may be wrapped and voids filled with PTFE or equivalent material (not shown).

Figure 5:
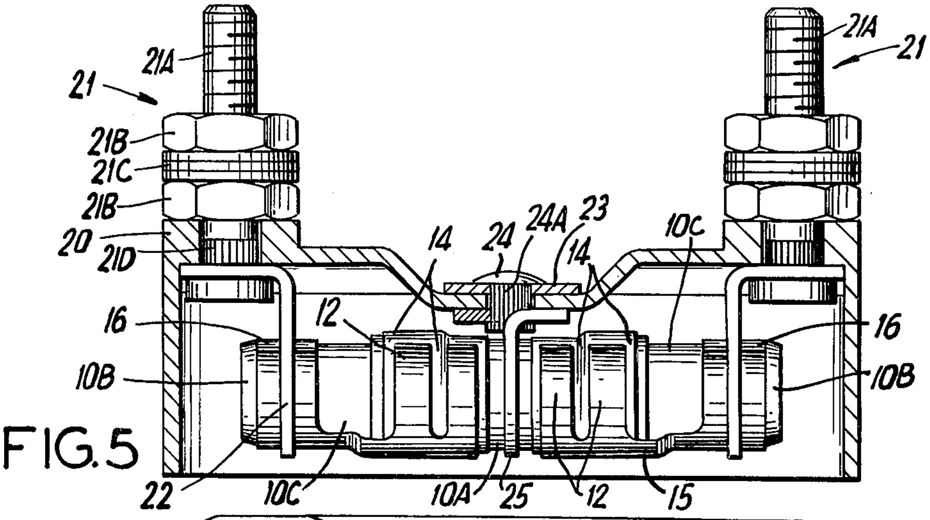
FIG. 5 is an elevational view, partly in section, of the modular component of another embodiment.
Figure 6:
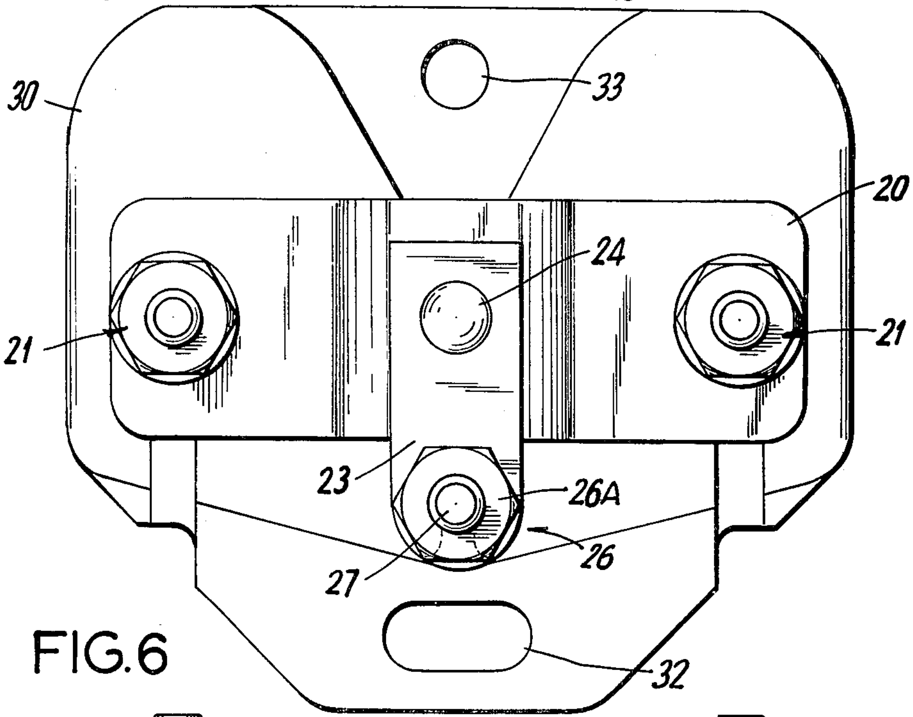
FIG. 6 is a plan view of the embodiment of FIG. 5 mounted in its housing.
Figure 7:
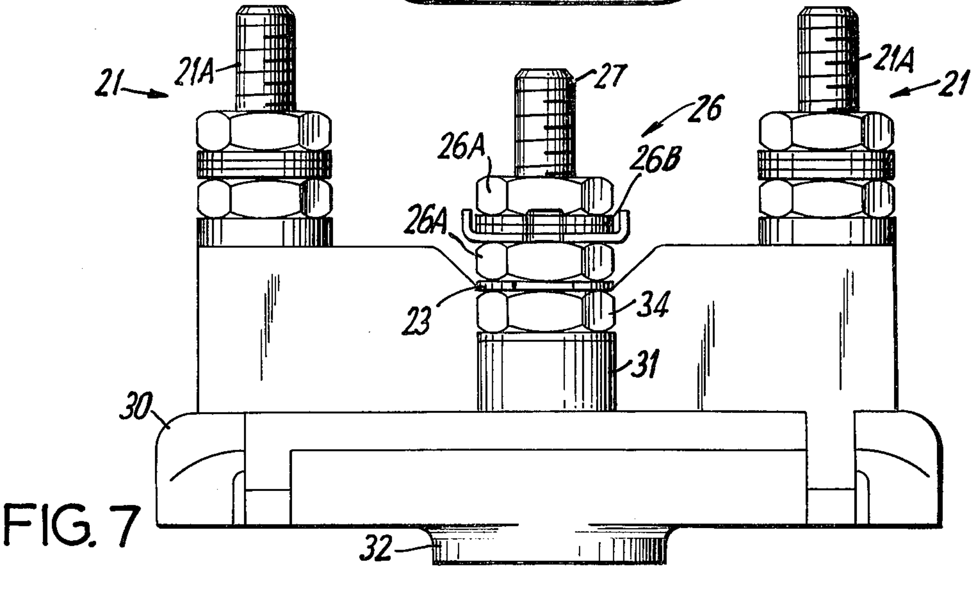
FIG. 7 is a plan view of the unit of FIG. 6.

An application of the arrester to a station protector configuration is illustrated in FIGS. 5 through 7. Tube 10 per se together with fusible sleeves 12 and shorting clips 15 have already been described above. However, whereas the embodiment of FIGS. 1 through 4 employed welded flexible circuit coupling leads, the instant embodiment is encapsulated in a modular shell 20 installed in turn in a base assembly 30. Shell 20 also contains fixed line terminals 21 and ground strap 23. Each line electrode end cap 10B is electrically and mechanically connected to a respective line terminal 21 by way of a generally L-shaped connector 22 having one section in engagement with the respective end cap in the region between fingers 16 of the associated shorting clip. This section of connector 22 is of generally spade lug configuration with the end cap resiliently engaged by the fingers of the lug.

The opposite end of connector 22 is connected to the ribbed shank portion of threaded stud 21A of terminal 21, the stud being pressed fit into housing 20 as shown particularly in FIG. 5. The threaded shaft portion includes nuts 21B and washers 21C to provide means for connection to the equipment lines.

Connection of center body 10A on tube 10 is provided by way of a generally L-shaped connector 25 having one section of generally spade lug configuration which resiliently engages housing 10A, and another section which is secured to knurled shank 24A of a pin 24 which secures ground strap 23 to center body connector 25.

The distal end of the ground strap 23 is connected to a ground terminal assembly 26 having a threaded stud 27 secured to base 30 by means of nut 34. To facilitate this connection, strap 23 terminates in a lug which fits around shaft 27 and is secured by nut 37. As with the line terminals 21, ground terminal assembly 26 includes nuts 26A and associated washers 26B to facilitate connection to the ground line.

The modular unit 20 with its tube and line terminals 21 and ground strap 23 are thus secured in the cavity in base 30 by way of the connection of ground strap 23 to the ground terminal assembly 26. Prior to assembly tube 10 is wrapped and potted in unit 20 as previously described relative to the first described embodiment.

The embodiment of FIGS. 5–7 functions in the manner previously described in connection with the systems of FIGS. 1–4. It furthermore illustrates the facility with which the arrester with its fail-safe features is packaged in various compact configurations.

From the foregoing description, application of the technique to both two-element and multi-element protectors will be apparent.

It should be noted that the fusible member configuration permits improved precision in the establishment of gap spacing in the backup airgap section.

Further, in the embodiment of FIGS. 5–7 it should be noted that the absence of the module 20 from the Base assembly prevents the connections of the load circuit to the input lines thereby, precluding the making of unprotected connections.

What is claimed is:

1. A fail-safe surge arrester system comprising:

(1) a gas filled housing including at least two electrodes defining an ionizable gap;

(2) short circuiting means biased toward a short circuit connection with said electrodes;

(3) fusible means in thermal contact with said gap and directly interposed between at least one of said electrodes and said short circuiting means, said fusible means comprising a plastic material having mechanical properties which change substantially under predetermined thermal conditions to prevent said short circuit connection at the fusible means except in the presence of a sustained overload causing said fusible means to fuse and yield to permit the establishment of said short circuit connection.

2. The arrester system as defined in claim 1 in which said fusible means comprises a meltable fluoropolymer.

3. The arrester system as defined in claim 1 in which said fusible means comprises heat shrinkable plastic material.

4. The arrester system as defined in claim 1 in which at least one of said electrodes is of cylindrical configuration and said fusible means comprises a sleeve coaxially fitted thereon.

5. The arrester system as defined in claim 1 in which said short circuiting means comprises a conductive clip resiliently engaging said housing.

6. The arrester system as defined in claim 1 in which said one electrode comprises a ground electrode.

7. The arrester system as defined in claim 1 in which said housing includes two line electrodes and a ground electrode, and in which a pair of said short circuiting means and a pair of said fusible means are provided, one for each line electrode-ground electrode combination.

8. A fail-safe surge arrester comprising:

(1) at least two electrode structures defining an ionizable gap;

(2) electrically conductive short circuiting means biased toward a short circuit connection with said electrode structures and having resilient engaging means;

(3) non-metallic fusible means in thermal contact with said gap and interposed between at least one of said electrode structures and said resilient engaging means of said short circuiting means to prevent said short circuit connection except in the presence of a sustained overload causing said fusible means to fuse and yield to permit said resilient engaging means to pass through said fusible means and into short circuit connection with said one electrode structure.

9. The arrester as defined in claim 8 in which said fusible means comprises a thermoplastic material.

10. The arrester as defined in claim 8 in which at least one of said electrode structures is of cylindrical configuration and said fusible means comprises a heat shrinkable plastic sleeve coaxially fitted thereon.

11. A fail-safe arrester system comprising a generally tubular shaped housing having at least two electrode structures defining an ionizable gap, said electrode structures each including an exterior section of said housing, said sections being axially displaced from each other, a fusible non-metallic electrically insulative element covering at least a portion of one of said sections and oriented to be responsive to thermal conditions of said arrester, short-circuiting means interconnecting said fusible element and said other section and having a contacting portion pressed against said fusible element such that it passes therethrough into contact with said one section in the event of sustained ionization of said gap.

12. An arrester system as defined in claim 11 including module means for retaining said housing, electrode structures, fusible element and short circuiting means, said module means also including terminal means for connecting said electrode structures to the circuit to be protected, said terminal means also being adapted to serve as the junction interconnecting said circuit and the network supplying same, whereby in the absence of said module means said interconnection cannot be made.

13. A fail-safe arrester system comprising:

(1) a gas filled housing including at least two electrodes defining an ionizable gap;

(2) a short circuiting structure adapted in one condition to provide a short circuit connection between said electrodes;

(3) non-metallic fusible means thermally responsive to thermal conditions of said ionizable gap and interconnected with said short circuiting structure to prevent said condition except in the presence of a sustained overload causing said fusible means to fuse and yield to permit the establishment of said short circuit connection through the fusible means.

14. An arrester as defined in claim 13 in which said fusible means comprises a meltable fluoropolymer.

15. An arrester as defined in claim 13 in which said fusible means comprises heat shrinkable plastic material.

16. A fail-safe surge arrester system comprising:

(1) a gas filled housing including at least two electrodes defining an ionizable gap;

(2) short circuiting means biased toward a short circuit connection with said electrodes;

(3) non-metallic fusible means in thermal contact with said gap and directly interposed between at least one of said electrodes and said short circuiting means to prevent said short circuit connection through the fusible means except in the presence of a sustained overload causing said fusible means to fuse and yield to permit the establishment of said short circuit connection;

(4) said short circuiting means including a section defining an air gap electrode.

17. A fail-safe surge arrester system comprising:

(1) a gas filled housing including at least two electrodes defining an ionizable gap;

(2) short circuiting means including one conductive section in electrical contact with one of said electrodes and another conductive section conductively connected to said one section and resiliently urged toward a short circuit connection with said other electrode;

(3) non-metallic fusible means in thermal contact with said gap and interposed directly between said other electrode and said another conductive section of the short circuiting means to prevent said short circuit connection except in the presence of a sustained overload causing said fusible means to fuse and yield to permit the establishment of said short circuit connection.

18. The arrester system as defined in claim 17 in which said other electrode comprises a conductive part of said housing and said fusible means comprises a thermoplastic covering on at least a portion of said conductive part.

19. The arrester system as defined in claim 18 in which said fusible means comprise a fusible fluoropolymer.

20. A fail-safe surge arrester system comprising:

(1) a gas filled housing including at least two electrodes defining an ionizable gap;

(2) short circuiting means biased toward a short circuit connection with said electrodes;

(3) non-metallic fusible sleeve concentrically fitted on at least one of said electrodes in thermal contact with said gap and interposed between the electrode and said short circuiting means to prevent said short circuit connection except in the presence of a sustained overload causing said fusible means to fuse and yield to permit the establishment of said short circuit connection, said sleeve defining a hole therein to provide an air gap; and (4) said short circuiting means including a section defining an air gap electrode.

21. The arrester system as defined in claim 20 in which said sleeve comprises heat shrinkable plastic material.

22. The arrester system as defined in claim 21 in which said heat shrinkable plastic material comprises a meltable fluoropolymer.

* * * * *